(12) United States Patent
Goerend

(10) Patent No.: US 9,625,022 B2
(45) Date of Patent: Apr. 18, 2017

(54) TORQUE CONVERTER WITH IMPELLER DEFLECTOR

(76) Inventor: David J. Goerend, Saint Lucas, IA (US)

(*) Notice: Subject to any disclaimer, the term of this patent is extended or adjusted under 35 U.S.C. 154(b) by 564 days.

(21) Appl. No.: 13/187,894

(22) Filed: Jul. 21, 2011

(65) Prior Publication Data

US 2012/0017579 A1 Jan. 26, 2012

Related U.S. Application Data

(60) Provisional application No. 61/367,200, filed on Jul. 23, 2010.

(51) Int. Cl.
*F16H 41/26* (2006.01)

(52) U.S. Cl.
CPC .................... *F16H 41/26* (2013.01)

(58) Field of Classification Search
CPC ........................................... F16D 33/20
USPC ........... 416/1, 180, 197 C; 60/361, 362, 365
See application file for complete search history.

(56) References Cited

U.S. PATENT DOCUMENTS

| 2,263,996 | A | * | 11/1941 | Kimberly, Jr. ................. 60/365 |
| 3,023,582 | A | * | 3/1962 | Ryan ............................... 60/338 |
| 4,324,529 | A | * | 4/1982 | Nickels ......................... 416/187 |
| 6,312,216 | B1 | * | 11/2001 | Falcimaigne .................. 415/74 |
| 6,334,307 | B1 | * | 1/2002 | Iwao et al. ..................... 60/367 |
| 6,959,239 | B2 | | 10/2005 | Williams et al. |
| 6,996,978 | B2 | | 2/2006 | Goerend |
| 7,264,574 | B2 | | 9/2007 | Tohta et al. |
| 7,454,902 | B2 | * | 11/2008 | Fukunaga et al. ............. 60/361 |
| 2008/0016859 | A1 | | 1/2008 | Endrasik, Jr. et al. |
| 2009/0000289 | A1 | * | 1/2009 | Wiegert et al. ................ 60/361 |
| 2009/0057086 | A1 | * | 3/2009 | Abe et al. .................... 192/3.31 |

* cited by examiner

*Primary Examiner* — Eric Keasel
*Assistant Examiner* — Matthew Wiblin
(74) *Attorney, Agent, or Firm* — McKee, Voorhees & Sease, PLC

(57) ABSTRACT

A torque converter impeller has a hemispherical wall with a plurality of vanes attached thereto. An improvement comprises a deflector adjacent the ends of the vanes to deflect fluid during rotation of the impeller such that the fluid is directed to the turbine vanes of the torque converter without overshooting the turbine. The deflector is preferably mounted to the inside surface of the impeller wall and extends 360°.

2 Claims, 5 Drawing Sheets

TORQUE CONVERTER WITH IMPELLER DEFLECTOR

CROSS-REFERENCE TO RELATED APPLICATIONS

This application claims priority under 35 U.S.C. §119 of a provisional application Ser. No. 61/367,200 filed Jul. 23, 2010, and which application is hereby incorporated by reference in its entirety.

FIELD OF THE INVENTION

The present invention generally relates to torque converters for use with vehicles utilizing automatic transmissions. More particularly, the invention relates to an improved impeller and method for directing oil from the impeller to the turbine in a torque converter.

BACKGROUND OF THE INVENTION

Torque converters have been known and used in combination with automatic transmissions of automobiles for quite some time. Generally, a torque converter consists of a housing, an impeller or pump, a turbine, a stator containing a one-way clutch, and a lock-up clutch.

The impeller is hemispherical with an outer wall having inner and outer surfaces, and a plurality of vanes radially mounted to the concave inner surface of the impeller wall. The turbine is rotatably mounted within a back wall, and also contains a plurality of vanes opposite the impeller vanes. The impeller wall is welded to the converter body to form an enclosed housing for the torque converter. The stator is located between the impeller and the turbine. The impeller has an input shaft operatively connected to the engine drive shaft. The turbine has an output shaft attached to the transmission input shaft so as to rotate the output shaft of the transmission.

Many improvements have been made to torque converters to improve operation and efficiency. For example, see Applicant's patent, U.S. Pat. No. 6,996,978, relating to an improved stator for the torque converter. Also, see the General Motors patent, U.S. Pat. No. 6,959,239, which discloses a cooling control for a torque converter; the Nissan patent, U.S. Pat. No. 7,264,574, which discloses a control device for the torque converter lock up; and the Daimlerchrysler published application, U.S. Publication No. 2008/0016859, which relates to augmented output method and apparatus for a torque converter.

In use, fluid, such as oil, is added into the torque converter housing. When the engine shaft rotates the impeller, the fluid starts rotating as well. As the rotation speeds up, centrifugal forces cause the fluid to flow outward toward the impeller vanes. The impeller vanes direct the fluid towards the turbine vanes, wherein the force of the fluid causes the turbine to rotate in the same direction as the impeller. The turbine shaft rotates the transmission shaft, which causes the vehicle to begin moving. The orientation of the turbine vanes directs the fluid towards the center of the turbine, where the vanes of the stator direct the fluid back towards the impeller, and the fluid cycle is repeated. Initially, the impeller will be rotating at a much greater speed than the turbine, which results in energy loss between input from the motor and output from the transmission. However, when the vehicle reaches a higher speed (over 40 miles per hour), the impeller and turbine will be rotating at approximately the same speed. At this time, a lock-up clutch will mechanically connect the impeller and the turbine so that they rotate at exactly the same speed to transfer 100% of the power through the torque converter.

The lock-up clutch is installed in front of the turbine. When engaged, the clutch will rotate with and lock together the rotational speeds of the impeller and the turbine. This is called the "lock-up operation." Because 100% of the power from the engine is passing through the torque converter, the vehicle will obtain greater fuel efficiency. However, problems exist with current designs of torque converters, and more specifically, with the design of the impeller. Because the impeller and turbine rotate independent of one another and contain separate vanes, when the centrifugal force directs the fluid outwardly towards the turbine, the turbine vanes may not receive all of the fluid. The fluid may overshoot the turbine vanes, and end up in front of the lock-up clutch. This fluid leak into the lock-up clutch increases the amount of time before the torque converter is able to "lock-up," or it may prevent lock-up all together. When the impeller and turbine are not locked together, heat is generated in the converter. The greater the load and RPM difference, the greater the heat generated. This heat is lost power, and results in a lower transmission life, performance and fuel economy.

Therefore, the present invention addresses an improvement in the art and provides a better method and means for the fluid to be directed from the impeller to the turbine in a torque converter for improved efficiency, reduced lock-up time, and enhanced fuel economy.

It is therefore a principal object, feature, and/or advantage of the present invention to provide an improved method and apparatus for increasing fuel efficiency in an automobile having an automatic transmission.

It is another object, feature, and/or advantage of the present invention to provide an improved method and apparatus for transferring a fluid from an impeller pump to a turbine in a torque converter.

It is another object, feature, and/or advantage of the present invention to provide an improved method and apparatus for decreasing the amount of time the torque converter will take to lock up.

It is another object, feature, and/or advantage of the present invention to provide an improved method and apparatus for increasing the life of a lock-up clutch.

It is another object, feature, and/or advantage of the present invention to provide an improved method and apparatus that is compatible with most automobiles having automatic transmissions.

Still another objective of the present invention is the provision of an improved torque converter impeller having a deflector for improved flow of fluid from the impeller to the turbine.

Yet another objective of the present invention is the provision of a deflector on a torque converter impeller to preclude fluid over-shoot of the turbine.

SUMMARY OF THE INVENTION

The improved torque converter of the present invention includes an impeller or pump, a turbine, and a stator between the impeller and the turbine. The impeller is operatively connected to the output shaft of the vehicle engine, while the turbine is operatively connected to the output shaft of the vehicle transmission. The improvement is a deflector, or series of deflectors, in the impeller, which direct the oil or fluid from the impeller to the turbine during operation of the torque converter and thereby eliminating or minimizing loss of functional fluid flow between the impeller and turbine so as to improve the efficiency of the torque converter and the engine.

DETAILED DESCRIPTION OF THE PREFERRED EMBODIMENTS

Figure 1:
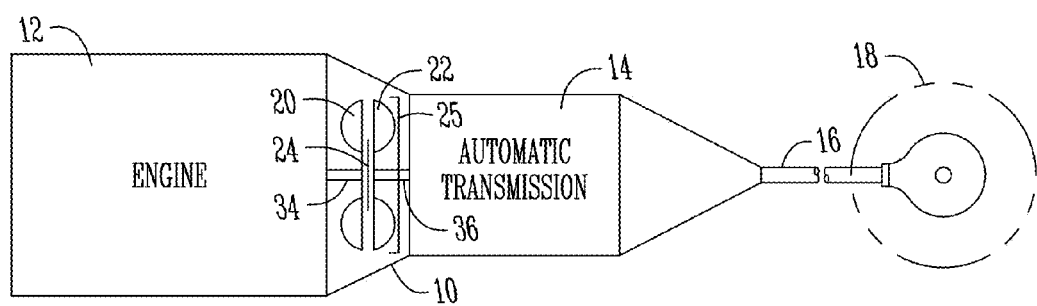
FIG. 1 is a schematic view of an engine, a torque converter, and an automatic transmission of an automobile.

As seen in FIG. 1, the torque converter of the present invention is generally designated by the reference numeral 10. The torque converter 10 is located between the vehicle engine 12 and the vehicle automatic transmission 14. The transmission includes an output shaft 16 which operatively drives one or more vehicle wheels 18.

Figure 2:
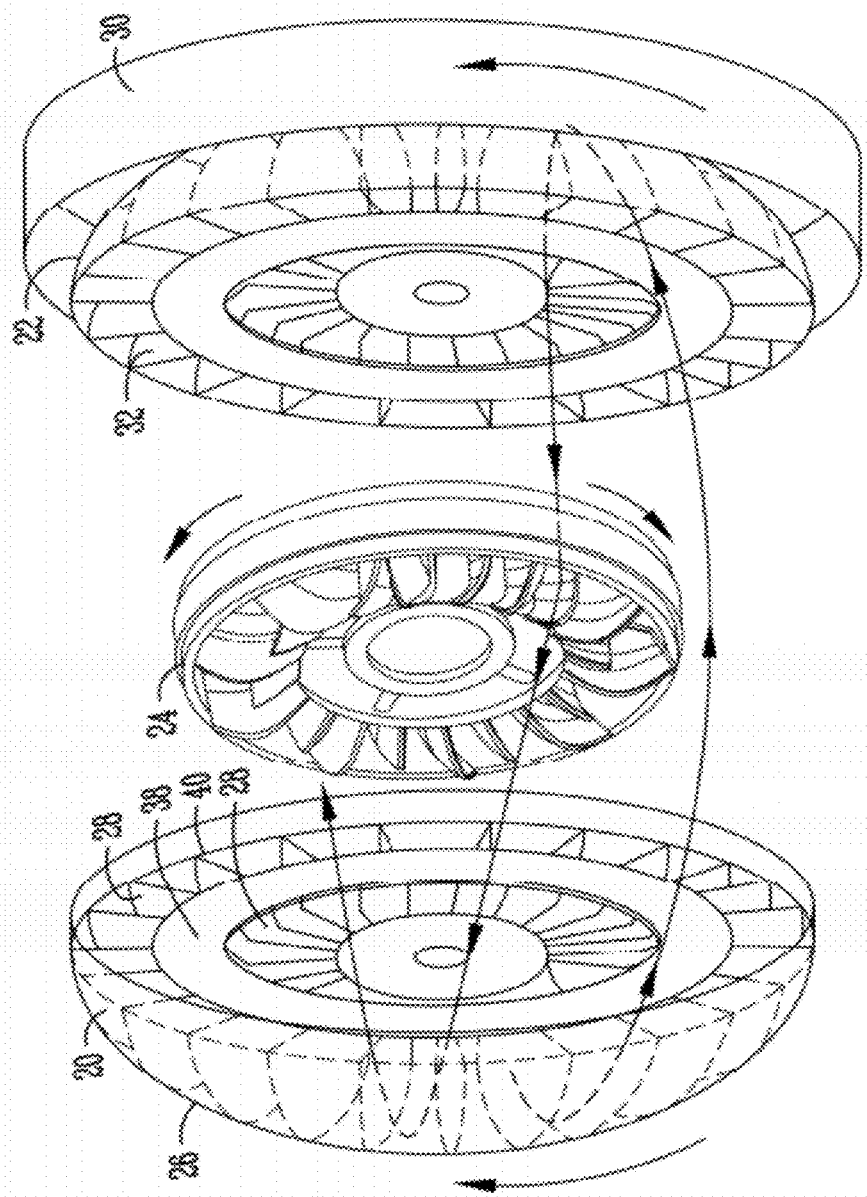
FIG. 2 is an exploded view of the torque converter.

The torque converter 10 includes an impeller 20, a turbine 22, and a stator 24, as shown in FIG. 2. The impeller 20 has a hemi-spherical body or wall 26 to which a plurality of blades or vanes 28 are fixed. The turbine 22 is rotatably mounted in a body 30 and has a plurality of blades or vanes 32. The impeller 20 has an input shaft 34 connected to the engine drive shaft by any convenient coupling means. The turbine 22 has an output shaft 36 connected to the transmission shaft 16 by any convenient coupling means. The torque converter 10 also includes a lock-up clutch 25.

The above description of the torque converter 10 is conventional.

Figure 3:
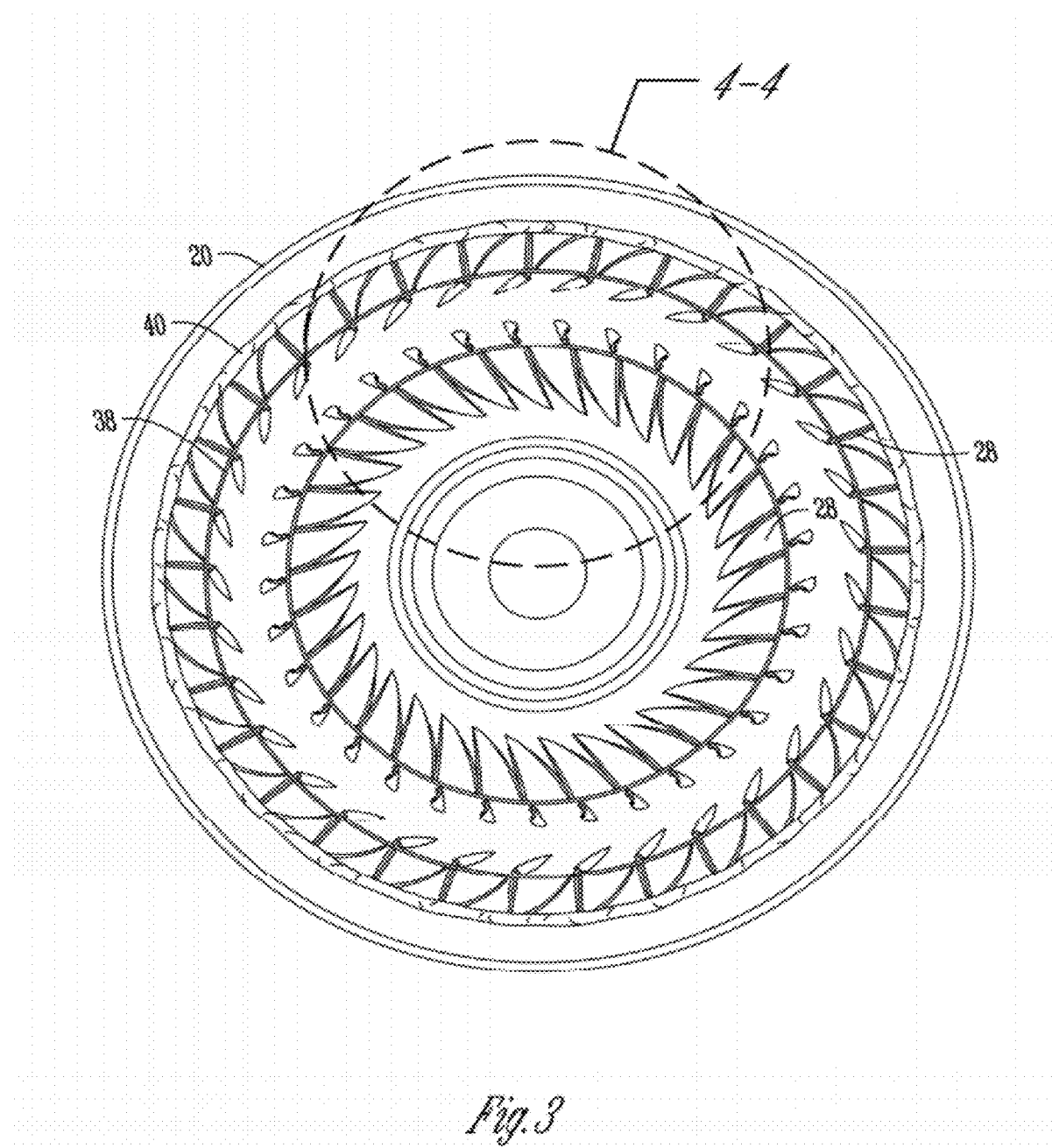
FIG. 3 is an elevation view of the inside of a preferred embodiment of a torque converter impeller of the present invention.

FIG. 3 shows a preferred embodiment of an impeller 20 of the present invention. The impeller vanes 28 are curved and extend radially about the center of the impeller. The impeller vanes 28 are spaced equally apart from one another, and are also oriented at substantially the same angle as one another. A ring 38 supports the vanes 28. The ring 38 is spaced from the wall 26 of the impeller 20.

Figure 4:
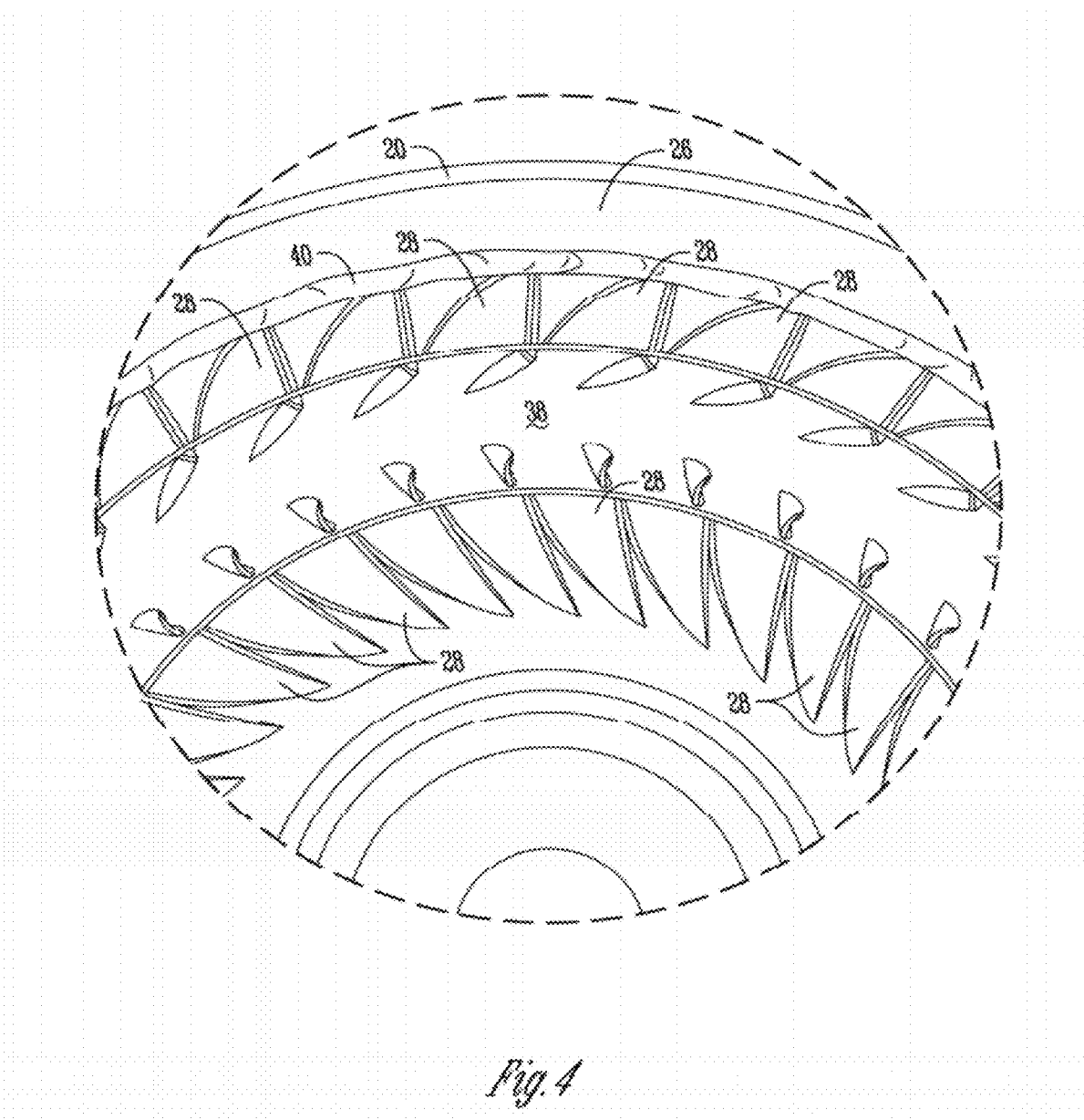
FIG. 4 in an enlarged view taken along line 4-4 of FIG. 3 and showing the impeller deflector adjacent the impeller vanes.

The improvement to the impeller, according to the present invention, is the provision of a deflector 40 positioned on the impeller wall 26 adjacent the outer ends of the vanes 28. The deflector 40 deflects a fluid, such as oil, into the turbine, as discussed in greater detail below. The deflector 40 may take many forms. In the embodiment of FIGS. 3 and 4, the deflector 40 is a weld bead adjacent the impeller vanes 28 and extending around the outer wall 26 of the impeller 20. The weld bead 40 is a continuous weld extending 360° around the inner periphery of the impeller wall 26.

Figure 5:
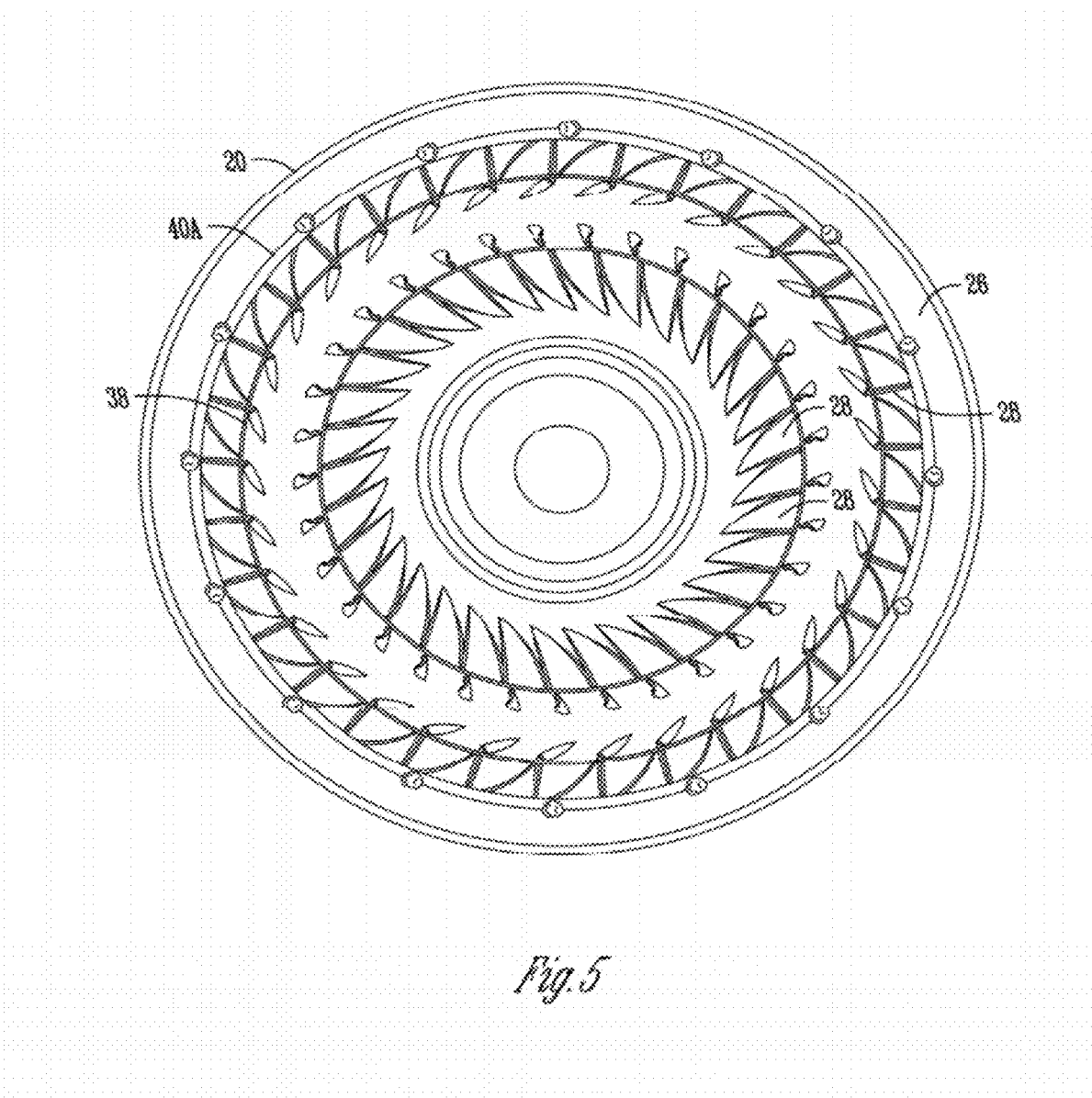
FIG. 5 is an elevation view of an impeller having an additional embodiment of a fluid deflector, according to the present invention.

FIG. 5 shows an alternative embodiment for the deflector 40A in the form of a rod on the impeller wall 26 adjacent the outer ends of the vanes 28. The rod 40A may be attached by weld, by adhesive, or by other means which will fix the rod to the inside surface of the wall 26 of the impeller 20. The rod 40A works similarly to the weld bead 40 of FIGS. 3 and 4 to deflect a fluid, as will be discussed below. Another example of a deflector may be a curved object attached or positioned below the outer edge of the vanes 28. Also, while the deflectors 40, 40A are shown to extend continuously 360°, it is understood that the deflector may be formed from a series of discontinuous segments on the wall 26 or on the vanes 28 adjacent the area of fluid flow past the vanes 28.

In use, the torque converter 10 contains a fluid, such as an oil. When the engine drive shaft begins to rotate, the input shaft 34 will rotate the impeller 20. The spinning of the impeller 20 produces centrifugal forces on the fluid, which forces the fluid between the vanes 28 along the outer wall 26. The impeller vanes 28 are oriented to direct the fluid towards the turbine vanes 32. The deflector 40, 40A directs the fluid towards the turbine 22, in such a way that the fluid will not overshoot the outer edge of the turbine or get behind the turbine. Because the impeller vanes 28 and the turbine vanes 32 are oriented opposite of one another, when the fluid is directed by the deflector 40. 40A and the impeller vanes 28, it will be forced against the turbine vanes 32 to produce a rotation of the turbine 22. The rotation of the turbine rotates the output shaft 36, which is connected to the transmission 14, so as to drive the vehicle wheels 18. The transfer of fluid from the impeller 20 to the turbine 22 without the loss of fluid as in prior art torque converters, improves the efficiency of a vehicle.

The orientation of the turbine vanes 32 will force the fluid towards the center of the turbine 22. The fluid will then contact the vanes of the stator 24, which directs the fluid back towards the vanes 28 of the impeller 20. This transfer of fluid creates a cycle wherein the fluid transfers from the impeller 20 to the turbine 22, through the stator 24, and back to the impeller 20. As the rotational speed of the impeller 20 increases with the rotational speed of the engine 12, the rotational speed of the turbine 22 will increase. At lower vehicle speeds, the impeller 20 will be rotating at a higher speed than the turbine 22.This difference in rotational speed is energy loss, and produces heat in the torque converter 10.At a certain rotational speed, the impeller 20 and the turbine 22 will be rotating at substantially the same rotational speed. At this time, the locking mechanism, such as a lockup clutch, will lock the rotation of the turbine 22 with the rotation of the impeller 20,thus synchronizing the rotation of the torque converter 10. At this moment, 100% of the input from the engine 12 is being outputted through the torque converter 10 to the transmission 14, to produce the greatest fuel efficiency for the vehicle. Because the impeller vanes 28 contain the deflector 40, 40A, the locking clutch will engage upon command. Additionally, the deflector 40, 40A will ensure that fluid does not get behind the turbine 22, which may cause the lock mechanism to overheat or not lock, which produces a much lower fuel efficiency, and could also potentially overheat the transmission 14.

The invention has been shown and described above with reference to the preferred embodiments, and it is understood that many modifications, substitutions, and additions may be made all within the intended spirit and scope of the invention. The invention is only to be limited by claims appended hereto.

What is claimed is:

1. A method of enhancing the lock-up performance of a motor vehicle's torque converter having an impeller, a turbine, and a lock-up clutch the method comprising:

rotating the impeller at speeds above idling to force oil radially outwardly towards a plurality of impeller vanes as the vehicle accelerates after a stop;

transferring the oil towards a plurality of turbine vanes to rotate the turbine; and precluding the oil from leaking out of the turbine at speeds above idling by deflecting the oil with a rod spot welded at intermittent spaces onto the impeller outer periphery adjacent the impeller vanes and contacting outer ends of the impeller vanes as the oil flows from the impeller vanes to the turbine vanes, such that the oil is deflected at the impeller outer periphery without over-shooting the turbine vanes, and whereby substantially all of the oil from the impeller to the turbine is deflected only by the intermittent spot welded rod without loss of oil to the turbine vanes, and thereby reducing the time needed to actuate the lock-up clutch.

2. The method of claim 1 wherein the oil deflection hastens lock-up time of the lock-up clutch.

\* \* \* \* \*